United States Patent
Kobele et al.

(10) Patent No.: US 10,433,198 B2
(45) Date of Patent: Oct. 1, 2019

(54) CHANNEL SOUNDING TESTING DEVICE AND METHOD TO ESTIMATE LARGE-SCALE PARAMETERS FOR CHANNEL MODELLING

(71) Applicant: Rohde & Schwarz GmbH & Co. KG, Munich (DE)

(72) Inventors: Johannes Kobele, Munich (DE); Andreas Kulessa, Menden (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 11 days.

(21) Appl. No.: 15/256,074

(22) Filed: Sep. 2, 2016

(65) Prior Publication Data

US 2017/0265094 A1 Sep. 14, 2017

Related U.S. Application Data

(60) Provisional application No. 62/305,493, filed on Mar. 8, 2016.

(51) Int. Cl.
| | |
|---|---|
| *H04W 24/10* | (2009.01) |
| *H04B 17/30* | (2015.01) |
| *H04L 25/02* | (2006.01) |
| *H04L 12/26* | (2006.01) |
| *H04B 17/391* | (2015.01) |

(52) U.S. Cl.
CPC .......... *H04W 24/10* (2013.01); *H04B 17/30* (2015.01); *H04B 17/3912* (2015.01); *H04L 25/0202* (2013.01); *H04L 43/16* (2013.01); *H04L 25/0228* (2013.01)

(58) Field of Classification Search
CPC ........ H04W 24/10; H04L 25/02; H04L 43/16; H04B 17/30
See application file for complete search history.

(56) References Cited

U.S. PATENT DOCUMENTS

| | | | | |
|---|---|---|---|---|
| 5,822,380 A | * | 10/1998 | Bottomley | .......... H04L 25/0204 375/254 |
| 2011/0158361 A1 | * | 6/2011 | Dent | ..................... H04L 25/022 375/347 |
| 2011/0205911 A1 | | 8/2011 | Kim | |
| 2014/0022988 A1 | * | 1/2014 | Davydov | .............. H04W 88/02 370/328 |
| 2014/0064247 A1 | * | 3/2014 | Teyeb | ............... H04W 36/0083 370/331 |
| 2015/0296526 A1 | * | 10/2015 | Behravan | ............. H04W 16/14 370/329 |

(Continued)

OTHER PUBLICATIONS

Dr. P. B. Paris "Modeling of Wireless Communication Systems using MATLAB" George Mason University, Dept. of Electrical and Computer Engineering, Sep. 23, 2010.*

(Continued)

*Primary Examiner* — Xavier Szewai Wong
(74) *Attorney, Agent, or Firm* — Potomac Technology Law, LLC

(57) ABSTRACT

A channel sounding testing device is provided. The channel sounding testing device comprises a processor configured to use channel models and scenario specific propagation parameters, which are verified by comparable channel measurements in representative environments, to perform testing operations.

4 Claims, 5 Drawing Sheets

---

Define noise threshold according to the following equation:

S50

$$\text{NoiseThreshold}_{dB} = \gamma + 20 \log_{10} \sqrt{\frac{1}{\Delta L} \sum_{i=1+(1-\Delta)L}^{L} |\alpha_i|^2} \ ,$$

where:
  $\gamma$ is a margin,
  $\alpha_i$ is the complex amplitude of the $i^{th}$ sample, amplitude of the sample,
  $L$ is the length of a channel impulse response,
    and
  $\Delta$ is a parameter.

S51 — For channel sounding, use channel models and scenario specific propagation parameters, such as the noise threshold, which are verified by comparable channel measurements in representative environments.

(56) References Cited

U.S. PATENT DOCUMENTS

2017/0126309 A1\* 5/2017 Rupasinghe ....... H04B 7/18506
2017/0207931 A1\* 7/2017 Gul ..................... H04L 25/0224
2018/0054294 A1\* 2/2018 Rappaport ........... H04B 17/104

OTHER PUBLICATIONS

U.S. Appl. No. 62/280,173 Provisional Application to U.S. Patent Publication 2017/0207931 A1 by Gul et al.\*
Flordelis et al, "Measurements of Large-Scale Parameters of a Distributed MIMO Antenna System in a Microcell Environment At 2.6 GHz", entire document (Year: 2013).\*
Schneider et al, "Large Scale Parameter for the WINNER II Channel Model at 2.53 GHz in Urban Macro Cell", entire document (Year: 2010).\*
Newton, "Channel Sounding in White Space Spectrum", 07_2011 MA199_0e, Rohde & Schwarz Application Note, https://www.rohde-schwarz.com/us/applications/channel-sounding-in-white-space-spectrum-application-note_56280-15762.html, Jul. 12, 2011.
Flordelis, et al., "Measurements of Large-Scale Parameters of a Distributed MIMO Antenna System in a Microcell Environment at 2.6 GHz", IEEE, 2013 7th European Conference on Antennas and Propagation (EuCAP), Jan. 1, 2013, 2915.
Schneider, et al., "Large Scale Parameter for the WINNER II Channel Model at 2.53 GHz in Urban Macro Cell", IEEE 71st Vehicular Technology Conference (VTC 2010—Spring), May 16, 2010, Section I.

\* cited by examiner

Define noise threshold according to the following equation:

$$\text{NoiseThreshold}_{dB} = \gamma + 20\log_{10}\sqrt{\frac{1}{\Delta L}\sum_{i=1+(1-\Delta)L}^{L}|\alpha_i|^2},$$

where:
$\gamma$ is a margin,
$\alpha_i$ is the complex amplitude of the $i^{th}$ sample, amplitude of the sample,
$L$ is the length of a channel impulse response, and
$\Delta$ is a parameter.

S50

For channel sounding, use channel models and scenario specific propagation parameters, such as the noise threshold, which are verified by comparable channel measurements in representative environments.

CHANNEL SOUNDING TESTING DEVICE AND METHOD TO ESTIMATE LARGE-SCALE PARAMETERS FOR CHANNEL MODELLING

RELATED APPLICATIONS

This application claims the benefit of the earlier filing date under 35 U.S.C. § 119(e) of U.S. Provisional Application Ser. No. 62/305,493 (filed Mar. 8, 2016).

FIELD

The invention concerns a channel sounding testing device, and a method with comparability of channel measurements to estimate large-scale parameters for channel modelling.

BACKGROUND

The 3rd Generation Partnership Project (3GPP) has recognized a need to study the performance and feasibility of using high frequency spectrum above 6 GHz for further evolution beyond the Long Term Evolution Advanced (LTE-Advanced) standard, and for technology advancement towards 5G. The aim is to develop a channel model to enable feasibility studies the development of a framework of using high frequency spectrum ranging from 6 GHz to 100 GHz.

Generally, different large-scale fading parameters can be used to describe and subsequently model a radio channel in different environments (e.g., indoor, universal mobile interface (UMI), universal mobile access (UMA), etc.). Usually, these parameters are derived from extensive channel sounding campaigns or parameters used in channel models, and are at least verified with representative channel measurements in different environments and dedicated frequency ranges.

For instance, the patent publication US20110205911A1 discloses a system and method for channel sounding of broadband signal carrier mobile communications.

Disadvantageously, however, the above-mentioned patent publication does not take into account the fact that different channel sounding approaches (e.g., frequency or time domain), or even the use of different channel sounding equipment (vector network analyzer (VNA), signal generator, signal analyzer, amplifier, low noise amplifier (LNA), up-converter, down-converter, cabling, sounding sequence, etc.), result in different dynamic ranges and thus also in different effective noise thresholds in the resulting measurement data.

Due to the fact that the estimation of the large scale fading parameters depends on the effective noise threshold of the underlying channel measurement, it is crucial to identify influencing measurement parameters and document these parameters along with the measurement results.

What is needed, therefore, is an approach for a channel sounding device, and processes for performing testing operations with the channel sounding device, using channel models and scenario specific propagation parameters, which are verified by comparable channel measurements in representative environments.

SUMMARY

Embodiments of the present invention advantageously address the foregoing requirements and needs, as well as others, by providing a channel sounding device and methods for performing testing operations with the channel sounding device, using channel models and scenario specific propagation parameters, which are verified by comparable channel measurements in representative environments. Such will facilitate the comparison of large scale fading parameters derived from various channel measurement campaigns with different equipment in order to validate the channel model. Further, the comparability issue of large scale fading parameters derived from channel measurements with two different noise thresholds is addressed, for example, by the root-mean-squared (RMS) delay spread.

In accordance with example embodiments, a channel sounding testing device is provided. The channel sounding testing device comprises a processor configured to use channel models and scenario specific propagation parameters, which are verified by comparable channel measurements in representative environments, to perform testing operations.

According to one embodiment of the channel sounding testing device, measurement parameters that affect the estimation of large scale parameters are documented along with the measurement results in order to ensure comparability.

By way of example, a one large scale parameter can be noise threshold.

By way of further example, the noise threshold can be expressed as follows:

$$\text{NoiseThreshold}_{dB} = \gamma + 20 \log_{10} \sqrt{\frac{1}{\Delta L} \sum_{i=1+(1-\Delta)L}^{L} |\alpha_i|^2},$$

where:

$\gamma$ is a margin, $\alpha_i$ is the complex amplitude of the $i^{th}$ sample, amplitude of the sample, L is the length of a channel impulse response, and $\Delta$ is a parameter.

By way of further example, the parameter $\Delta$ is within the interval:

$$\frac{1}{L} \leq \Delta \leq 1, \text{ where } \Delta \text{ is in steps of } \frac{1}{L}.$$

By way of further example, the channel impulse response h(t) can be expressed as:

$$h(t) = \sum_{i=1}^{L} \alpha_i(t) \cdot \delta(t - \tau_i),$$

where $\tau_i$ is the delay of the $i^{th}$ sample.

According to a further embodiment of the channel sounding testing device, for all measurements, the effective noise threshold, as well as the parameters used in the equation to estimate this noise threshold are documented in order to achieve comparability of the derived large scale parameters.

In accordance with further example embodiments, a method for performing measurements with a channel sounding testing device is provided. The method comprises performing testing operations, by the channel sounding testing device, using channel models and scenario specific propagation parameters, which are verified by comparable channel measurements in representative environments.

According to one embodiment of the method, measurement parameters that affect the estimation of large scale parameters are documented along with the measurement results in order to ensure comparability.

By way of example, a one large scale parameter can be noise threshold.

By way of further example, the noise threshold can be expressed as follows:

$$\text{NoiseThreshold}_{dB} = \gamma + 20 \log_{10} \sqrt{\frac{1}{\Delta L} \sum_{i=1+(1-\Delta)L}^{L} |\alpha_i|^2},$$

where:
$\gamma$ is a margin,
$\alpha_i$ is the complex amplitude of the $i^{th}$ sample, amplitude of the sample,
L is the length of a channel impulse response, and
$\Delta$ is a parameter.

By way of further example, the parameter $\Delta$ is within the interval:

$$\frac{1}{L} \leq \Delta \leq 1,$$

where $\Delta$ is in steps of $$\frac{1}{L}.$$

By way of further example, the channel impulse response h(t) can be expressed as:

$$h(t) = \sum_{i=1}^{L} \alpha_i(t) \cdot \delta(t - \tau_i),$$

where $\tau_i$ is the delay of the $i^{th}$ sample.

According to a further embodiment of the method, for all measurements, the effective noise threshold, as well as the parameters used in the equation to estimate this noise threshold are documented in order to achieve comparability of the derived large scale parameters.

In accordance with further example embodiments, a non-transitory computer-readable storage medium is provided, including computer program code, where, when the computer program code is executed on one or more processors of a channel sounding testing device, the device performs measurements using channel models and scenario specific propagation parameters, which are verified by comparable channel measurements in representative environments.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which:

FIG. 5 shows a flow chart depicting a method for performing measurements with a channel sounding testing device, in accordance with example embodiments.

DETAILED DESCRIPTION

Figure 1:
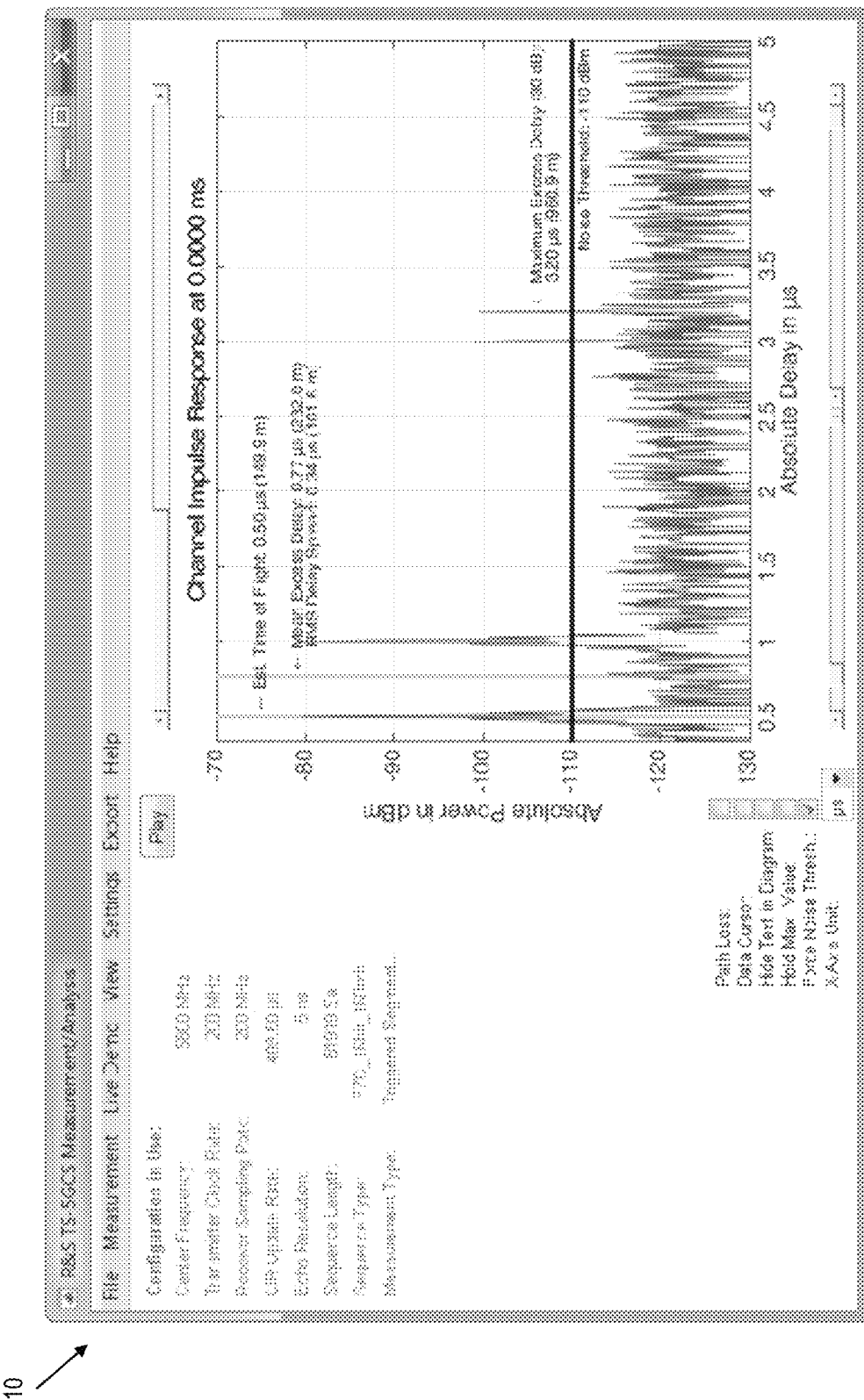
FIG. 1 shows a channel measurement and the estimated large scale parameters (mean excess delay, RMS delay spread, and maximum excess delay), in accordance with example embodiments.

A channel sounding device, and processes for performing testing operations with the channel sounding device, using channel models and scenario specific propagation parameters, which are verified by comparable channel measurements in representative environments, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein), such as a "processor" may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 1 shows a channel measurement and the estimated large scale parameters (mean excess delay, RMS delay spread, and maximum excess delay), in accordance with example embodiments of the present invention. FIG. 1 is based on an assumed noise threshold of −110 dBm. The measurement scenario was artificially generated by means of a fading simulator, with the fading profile specified in Table 1, in order to achieve reproducibility.

TABLE 1

| Simulated Channel Impulse Response | | | | |
|---|---|---|---|---|
| | Path 1 | Path 2 | Path 3 | Path 4 |
| Path Loss | 0 dB | 0 dB | 20 dB | 20 dB |
| Additional Delay | 0.5 µs | 1 µs | 3 µs | 3.2 µs |

Calculating the propagation parameters from the simulated channel impulse response (according the following equations) yields the following values for the mean excess delay $\bar{\tau}$, the second moment of the delay $\overline{\tau^2}$ and the RMS delay spread $\sigma_\tau$, respectively.

$$\bar{\tau} = \frac{\Sigma_k P(\tau_k) \cdot \tau_k}{\Sigma_k P(\tau_k)} = \frac{1 \cdot 0.5 \ \mu s + 1 \cdot 1 \ \mu s + 0.01 \cdot 3 \ \mu s + 0.01 \cdot 3.2 \ \mu s}{1 + 1 + 0.01 + 0.01} = \frac{1.56 \ \mu s}{2.02} = 0.77 \ \mu s \quad (1)$$

$$\overline{\tau^2} = \frac{\Sigma_k P(\tau_k) \cdot \tau_k^2}{\Sigma_k P(\tau_k)} = \frac{1 \cdot (0.5 \ \mu s)^2 + 1 \cdot (1 \ \mu s)^2 + 0.01 \cdot (3 \ \mu s)^2 + 0.01 \cdot (3.2 \ \mu s)^2}{1 + 1 + 0.01 + 0.01} = 0.71 \ (\mu s)^2$$

$$\sigma_\tau = \sqrt{\overline{\tau^2} - \bar{\tau}^2} = \sqrt{0.71 \ (\mu s)^2 - (0.77 \ \mu s)^2} = 0.34 \ \mu s$$

The estimated RMS delay spread from the channel measurement in FIG. 1, with the noise threshold of −110 dBm, correlates very well with the expected results (in both cases RMS delay spread $\sigma_\tau = 0.34$ µs).

Figure 2:
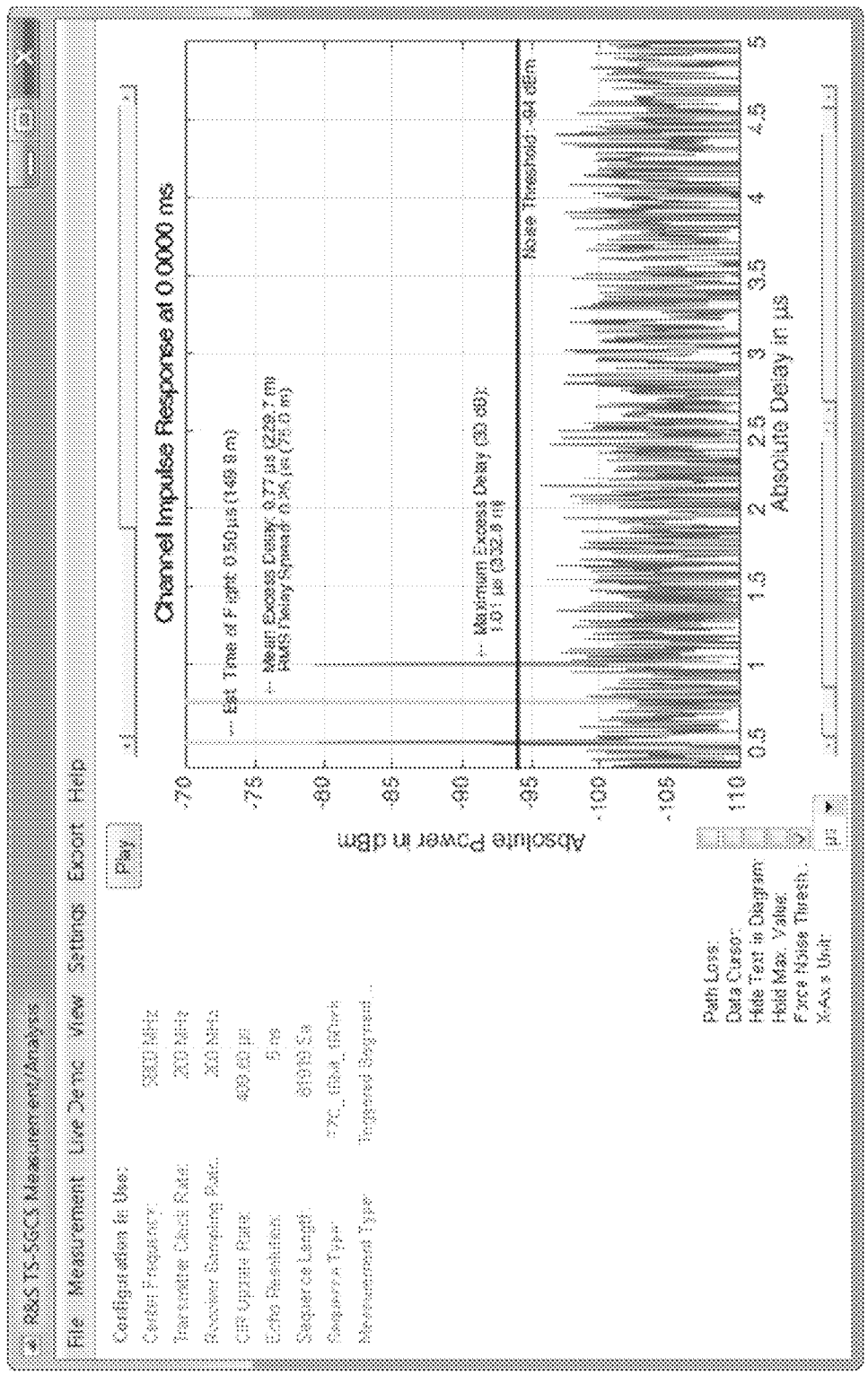
FIG. 2 shows the channel measurement of FIG. 1, with a slightly higher noise threshold of −94 dBm, in accordance with example embodiments.

FIG. 2 shows the channel measurement of FIG. 1, with a slightly higher noise threshold of −94 dBm, in accordance with example embodiments of the present invention. The reason for different noise thresholds in the measurement results in FIG. 2 may be the use of a different setup. Nevertheless, the measurements depicted in FIG. 2 were performed with the same setup, but with additional noise simulated inside the signal generator. The estimated RMS delay spread is reduced to $\sigma_\tau = 0.25$ µs, because some multipath components are now below the noise threshold of the measurement data.

This example shows the influence of the noise threshold on the RMS delay spread parameter estimation process.

In order to generate the estimated large scale fading parameters used for channel modelling comparable, relevant parameters like the effective noise threshold of the underlying channel measurements need to be set to a meaningful value and also need to be documented.

According to one example embodiment, an approach to estimate a meaningful noise threshold for a specific channel measurement automatically comprises an analysis of the part of the channel impulse response where one can expect no additional multipath components. This is usually the case for the last part of the measured channel impulse response, under the precondition that the relevant measurement parameters (e.g., the length of the recorded channel impulse response) are chosen according to the currently expected channel conditions.

By way of example, the measured channel impulse response h(t) with the length L can be described by h(t), where $\alpha_i$ is the complex amplitude at the delay $\tau_i$, as follows:

$$h(t) = \sum_{i=1}^{L} \alpha_i(t) \cdot \delta(t - \tau_i) \quad (2)$$

By way of further example, a meaningful noise threshold can be estimated by calculating the RMS value of the last part of the channel impulse response specified by the factor $$\Delta \left( \frac{1}{L} \leq \Delta \leq 1, \right.$$

where $\Delta$ is in steps of $$\left. \frac{1}{L} \right)$$

and subsequently adding a margin γ. This approach of noise threshold estimation can be described by the following parameterizable equation:

$$\text{NoiseThreshold}_{dB} = \gamma + 20 \log_{10} \sqrt{\frac{1}{\Delta L} \sum_{i=1+(1-\Delta)L}^{L} |\alpha_i|^2} \quad (3)$$

where:

γ is a margin, $\alpha_i$ is the complex amplitude of the $i^{th}$ sample, amplitude of the sample, L is the length of a channel impulse response, and Δ is a parameter.

By way of further example, meaningful values for the fraction Δ of the channel impulse response that is used for noise threshold estimation and the margin γ are as follows: Δ≈0.1, γ=3 dB.

By way of further example, independent of manually or automatically selecting the noise threshold, the value may be documented along with the channel measurement and the derived channel model parameters.

Accordingly, the comparability issue of large scale fading parameters derived from channel measurements conducted with different channel sounding setups, and thus with different effective noise thresholds, are thereby addressed.

Additionally, an equation to estimate a meaningful noise threshold from the raw channel measurement data is provided. Since the estimated effective noise threshold of the underlying measurement data is affecting the estimation of large scale fading parameters (e.g., RMS delay spread), only a common understanding of this parameter and its documentation makes a comparison of parameters derived from different channel measurement campaigns possible.

Figure 3:
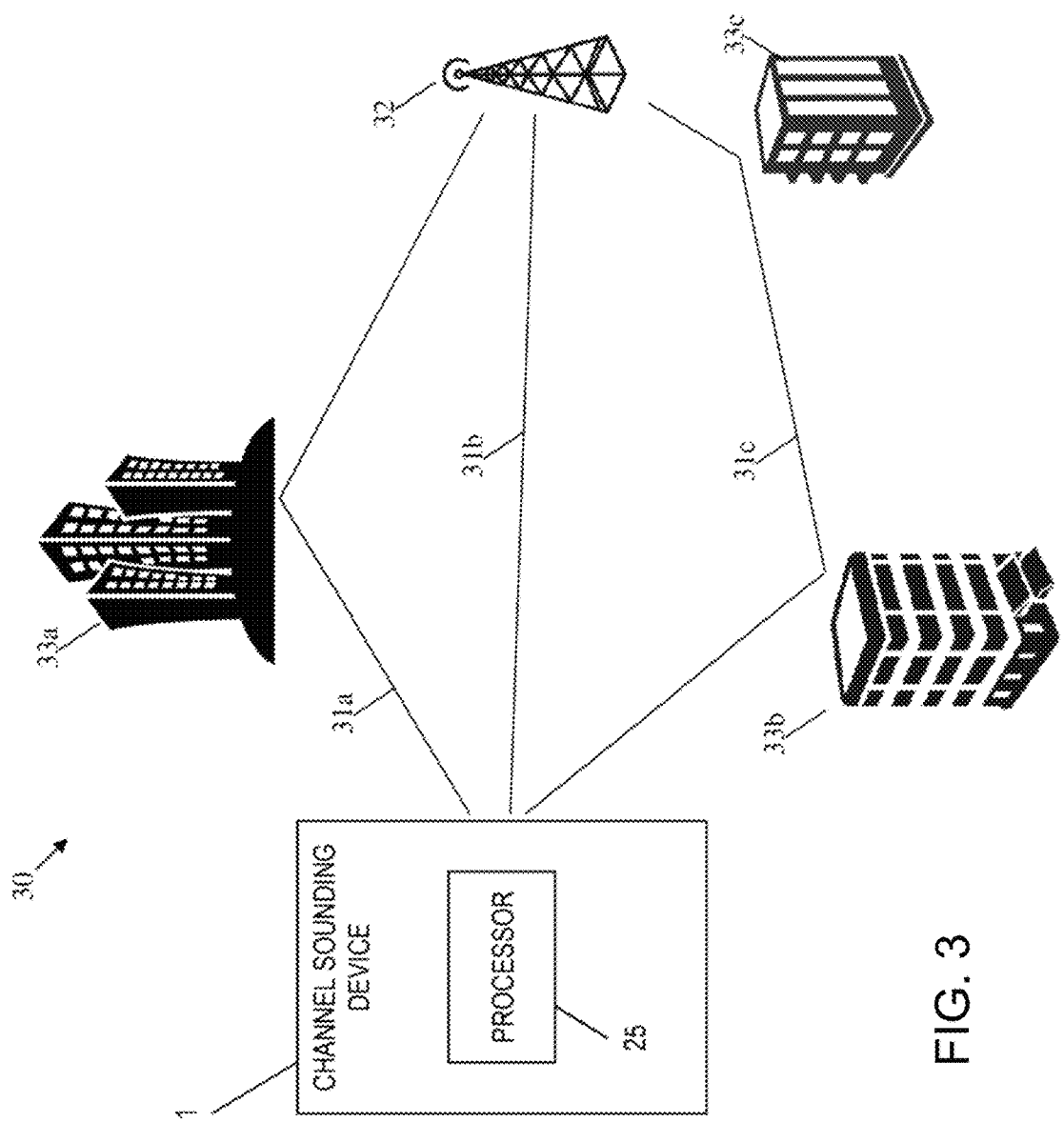
FIG. 3 shows a measurement setup the channel sounding testing device, in accordance with example embodiments.
Figure 4:
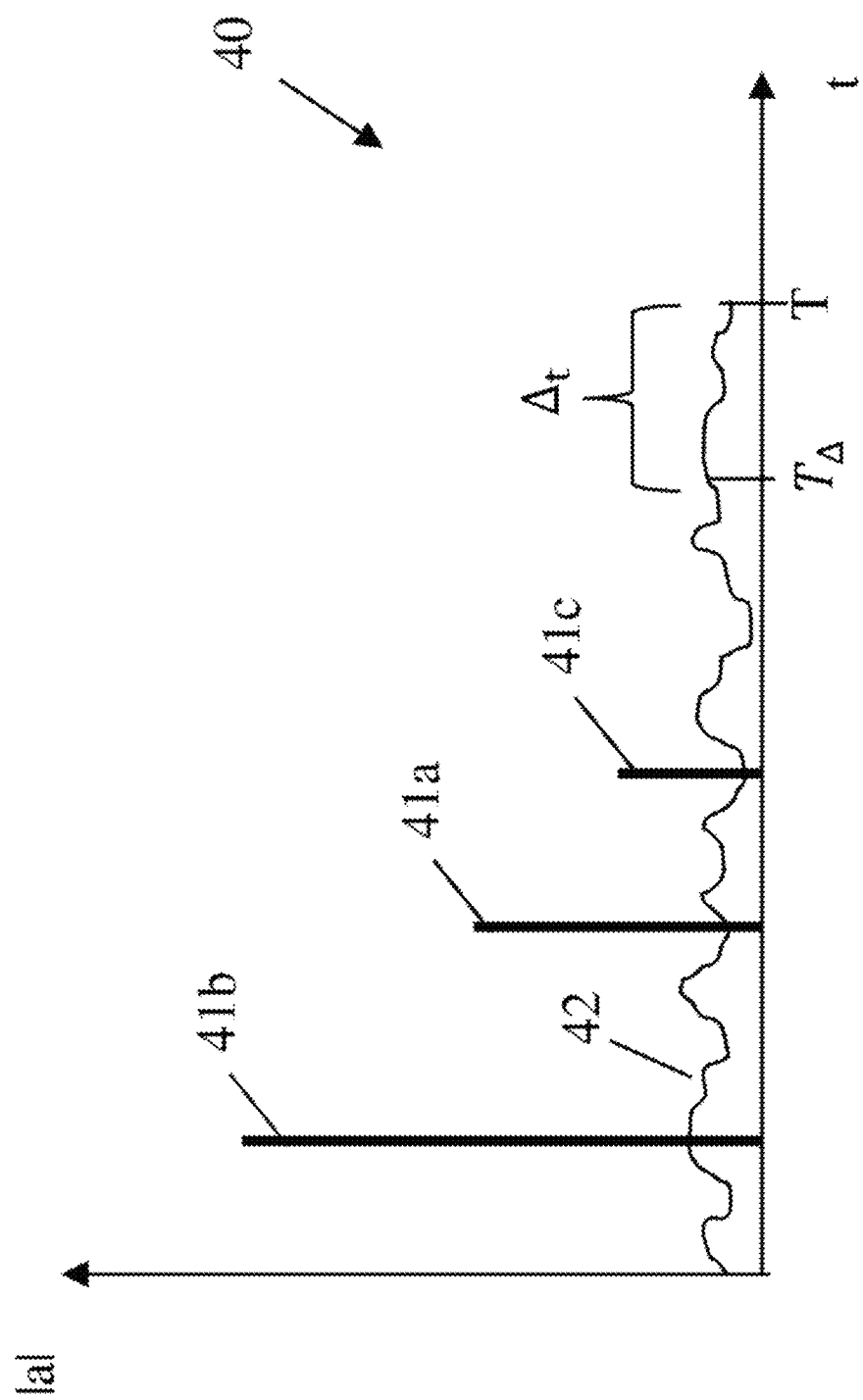
FIG. 4 shows a channel impulse response resulting from the measurement setup of FIG. 3.

FIG. 3 shows a measurement setup 30 using the channel sounding testing device 1, and FIG. 4 shows a channel impulse response resulting from the measurement setup of FIG. 3, in accordance with example embodiments of the present invention. The channel sounding testing device 1 comprises a processor 25 configured to perform the channel sounding testing device operations as described herein. With reference to FIG. 3, due to reflections of a signal transmitted by a base station 32, at obstacles such as buildings 33a, 33b, 33c, the transmitted signal takes different signal paths 31a, 31b, 31c from the base station 32 to the channel sounding device 1. Consequently, due to their different length, these various signal paths 31a, 31b, 31c lead to the corresponding multipath components 41a, 41b, 41c appearing at the respective points of time in the channel impulse response shown in diagram 40 of FIG. 4.

Additionally, FIG. 4 also illustrates noise 42. Further, the parameter $\Delta_t$ analogously corresponds to the above-mentioned parameter Δ and can be calculated as $\Delta_t = T - T_A$, where T (>$T_A$) denotes the duration of the channel impulse response, respectively the recording duration, and $T_A$ denotes an arbitrary point of time, after which only noise and no further multipath components occur.

FIG. 5 shows a flow chart depicting a method for performing measurements with a channel sounding testing device, in accordance with example embodiments of the present invention. In step S50, noise threshold is defined according to the following equation:

$$\text{NoiseThreshold}_{dB} = \gamma + 20 \log_{10} \sqrt{\frac{1}{\Delta L} \sum_{i=1+(1-\Delta)L}^{L} |\alpha_i|^2}$$

where:

γ is a margin, $\alpha_i$ is the complex amplitude of the $i^{th}$ sample, amplitude of the sample, L is the length of a channel impulse response, and Δ is a parameter.

In S51, for channel sounding, channel models and scenario specific propagation parameters (such as the noise threshold), are used, which are verified by comparable channel measurements in representative environments.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A channel sounding testing device, comprising:

a processor configured to perform wireless channel testing operations using channel models and propagation parameters for a specific measurement scenario, which are verified by comparable channel measurements; and wherein measurement parameters that affect estimation of one or more large scale parameters are documented along with the measurement results in order to ensure comparability, wherein a one of the large scale parameters is a noise threshold, wherein for all measurements, the noise threshold, as well as the parameters used for estimation of the noise threshold, are documented in order to achieve comparability of the derived large scale parameters, and wherein the noise threshold is defined according to the following equation:

$$\text{NoiseThreshold}_{dB} = \gamma + 20 \log_{10} \sqrt{\frac{1}{\Delta L} \sum_{i=1+(1-\Delta)L}^{L} |\alpha_i|^2}$$

where:

γ is a margin, $\alpha_i$ is a complex amplitude of the $i^{th}$ sample, amplitude of the sample, L is a length of a channel impulse response, and Δ is a parameter within the interval $$\frac{1}{L} \leq \Delta \leq 1,$$

and where $\Delta$ is in steps of $$\frac{1}{L}.$$

2. The channel sounding testing device according to claim 1, wherein a channel impulse response h(t) is defined by $h(t)=\Sigma_{i=1}^{L}\alpha_i(t)\cdot\delta(t-\tau_i)$, where $\tau_i$ is a delay of the $i^{th}$ sample.

3. A testing method comprising:
   performing wireless channel testing operations, by a channel sounding testing device, using channel models and propagation parameters for a specific measurement scenario, which are verified by comparable channel measurements; and
   wherein measurement parameters that affect estimation of one or more large scale parameters are documented along with measurement results in order to ensure comparability,
   wherein a one of the large scale parameters is a noise threshold,
   wherein for all measurements, the noise threshold, as well as the parameters used for estimation of the noise threshold, are documented in order to achieve comparability of the derived large scale parameters, and
   wherein the noise threshold is defined according to the following equation:

$$\text{NoiseThreshold}_{dB} = \gamma + 20\ \log_{10}\sqrt{\frac{1}{\Delta L}\sum_{i=1+(1-\Delta)L}^{L}|\alpha_i|^2}$$

where:
  $\gamma$ is a margin,
  $\alpha_i$ is a complex amplitude of the $i^{th}$ sample, amplitude of the sample,
  L is a length of a channel impulse response, and
  $\Delta$ is a parameter within the interval $$\frac{1}{L} \leq \Delta \leq 1,$$

and where $\Delta$ is in steps of $$\frac{1}{L}.$$

4. The testing method according to claim 3, wherein a channel impulse response h(t) is defined by $h(t)=\Sigma_{i=1}^{L}\alpha_i(t)\cdot\delta(t-\tau_i)$, where $\tau_i$ is a delay of the $i^{th}$ sample.

* * * * *